United States Patent
Deivasigamani et al.

(10) Patent No.: US 12,147,949 B2
(45) Date of Patent: Nov. 19, 2024

(54) SERVICE PROGNOSIS FORMULATION FOR AN APPLIANCE

(71) Applicant: Intellihot, Inc., Galesburg, IL (US)

(72) Inventors: Sridhar Deivasigamani, Peoria, IL (US); Sivaprasad Akasam, Dunlap, IL (US)

(73) Assignee: Intellihot, Inc., Galesburg, IL (US)

( * ) Notice: Subject to any disclaimer, the term of this patent is extended or adjusted under 35 U.S.C. 154(b) by 38 days.

(21) Appl. No.: 17/547,205

(22) Filed: Dec. 9, 2021

(65) Prior Publication Data
US 2023/0186249 A1    Jun. 15, 2023

(51) Int. Cl.
*G06Q 10/20*    (2023.01)

(52) U.S. Cl.
CPC .................. *G06Q 10/20* (2013.01)

(58) Field of Classification Search
None
See application file for complete search history.

(56) References Cited

U.S. PATENT DOCUMENTS

| | | | | |
|---|---|---|---|---|
| 5,571,007 A * | 11/1996 | Ishiguro | ............... | F23N 5/242 |
| | | | | 126/388.1 |
| 6,095,031 A * | 8/2000 | Warne | ............... | A47J 31/52 |
| | | | | 99/283 |
| 10,741,087 B1 * | 8/2020 | Picardi | ............... | G05D 1/0094 |
| 10,808,351 B1 * | 10/2020 | Flachsbart | ............... | G01K 13/00 |
| 2001/0049321 A1 * | 12/2001 | Cohen | ............... | A63B 24/00 |
| | | | | 482/8 |
| 2003/0158803 A1 * | 8/2003 | Darken | ............... | G06Q 10/087 |
| | | | | 705/36 R |
| 2005/0144264 A1 * | 6/2005 | Gruhn | ............... | G05B 23/0267 |
| | | | | 709/223 |
| 2007/0038563 A1 * | 2/2007 | Ryzerski | ............... | G06Q 30/04 |
| | | | | 705/40 |
| 2012/0073519 A1 * | 3/2012 | Deivasigamani | ... | F24D 19/1051 |
| | | | | 122/406.1 |
| 2014/0101058 A1 * | 4/2014 | Castel | ............... | G06Q 10/20 |
| | | | | 705/305 |
| 2016/0055072 A1 * | 2/2016 | Baloch | ............... | G06F 8/656 |
| | | | | 717/121 |
| 2016/0216007 A1 * | 7/2016 | Harbin, III | ............... | F24H 1/0018 |

(Continued)

FOREIGN PATENT DOCUMENTS

| | | | | |
|---|---|---|---|---|
| EP | 2706303 A1 * | 9/2013 | ............. | F24D 19/10 |
| EP | 2996084 A1 * | 3/2014 | ............. | G06Q 50/12 |
| WO | WO2020068110 A1 * | 4/2020 | ............. | G06Q 10/06 |

OTHER PUBLICATIONS

F.J.A.M. van Houten, F. Kimura, The Virtual Maintenance System: A Computer-Based Support Tool for Robust Design, Product Monitoring, Fault Diagnosis and Maintenance Planning, CIRP Annals, vol. 49, Issue 1, 2000, pp. 91-94, ISSN 0007-8506, https://doi.org/10.1016/S0007-8506(07)62903-5. (Year: 2000).*

*Primary Examiner* — Paul R Fisher
(74) *Attorney, Agent, or Firm* — Jong Patent Firm; Cheng Ning Jong; Tracy P. Jong

(57) ABSTRACT

A method for formulating a service prognosis for an appliance, the method including determining a representative usage during a current period of time, extrapolating a prior usage based on the representative usage for a prior period of time to result in a prior usage and determining the service prognosis based on substantially the prior usage.

7 Claims, 5 Drawing Sheets

(56) References Cited

U.S. PATENT DOCUMENTS

| | | | |
|---|---|---|---|
| 2017/0076263 A1* | 3/2017 | Bentz | G06Q 20/102 |
| 2017/0078111 A1* | 3/2017 | Bryce | G06Q 10/20 |
| 2018/0251142 A1* | 9/2018 | Wait | G01L 5/284 |
| 2018/0322401 A1* | 11/2018 | Wongkar | G06Q 30/0241 |
| 2018/0329407 A1* | 11/2018 | Disisto | G07C 3/02 |
| 2019/0057169 A1* | 2/2019 | Santarone | G06T 19/006 |
| 2020/0004231 A1* | 1/2020 | Anderson | F24H 15/36 |

\* cited by examiner

| Heat Exchanger/ Tank Life | Component Life | Prognosis Rating |
|---|---|---|
| < 60% | < 60% | A |
| < 60% | between 60% and 80% | B |
| > 60% | between 60% and 80%<br>> 80% | C<br>C |
| > 80% | > 80% | F<br>F |

A – operating normally, rerun diagnostics in 1 year

B – operating normally, but replace within six months or risk unplanned failure

C – operating poorly and needs to be replace within next two months

D – failed or imminent failure, needs to be replaced

*FIG. 6*

SERVICE PROGNOSIS FORMULATION FOR AN APPLIANCE

BACKGROUND OF THE INVENTION

1. The Field of the Invention

The present invention relates to an equipment life predictor. More specifically, the present invention is directed to a hot water supply equipment life predictor.

2. Background Art

Conventional service actions often involve replacing a consumable component, e.g., an electrode, in the case of a combustion-based hot water heating system during an unscheduled or even a scheduled maintenance appointment. In some cases, the cause of an unexpected breakdown of an appliance is not well-understood before various components or the equipment itself start to be replaced so that the equipment or a component can be returned to factory so that the root cause of the breakdown can be identified. In some cases, the root cause of a breakdown would never be known as it is never pursued further. When equipment or components are prematurely replaced, this not only increases the procurement costs but also the labor costs involved in installing the new equipment or components. A proposal for simply replacing an equipment or component is often made by an equipment provider or servicer without due justification, e.g., its remaining useful life. The proposal is often accepted without question or further exploration on the part of the equipment owner as the equipment owner does not have other options as the health or service life data of the equipment is not monitored or the data is not made available to the equipment owner. Scheduled maintenance appointments themselves may also be wasteful. Often times, these appointments are necessary because no equipment life information is available to the service personnel or the equipment owner to determine whether and when an equipment or component requires attention. In some circumstances, it is not possible to identify the severity of a problem or breakdown without destroying the equipment or component, e.g., in the case of scaling in the case of a water heater. Further, for an equipment or a component having remaining useful life, it would be impossible to determine the amount of useful life that remains. Therefore, without information on the true condition of the equipment or component, no enhanced service actions can be scheduled. The problem of an untimely service or a wasteful service action is compounded by the lack of accurate and detailed service records that accompany an appliance upon which a service action is to be carried out.

There exists a need for a system and method for scheduling service actions that can reduce wastes generated by uninformed service actions.

SUMMARY OF THE INVENTION

In accordance with the present invention, there is provided a method for formulating a service prognosis for an appliance, the method including:
(a) determining a representative usage during a current period of time;
(b) extrapolating a prior usage based on the representative usage for a prior period of time to result in a prior usage; and
(c) determining the service prognosis based on substantially the prior usage.

In one embodiment, wherein the representative usage during the current period of time is a usage based on at least one operating parameter. In one embodiment, the at least one operating parameter is operating pressure, operating temperature, water hardness, flue temperature, flue temperature rise rate or any combinations thereof. In one embodiment, the representative usage is a total number of firing cycles of a burner, a total amount of time a heat exchanger has been in use, a total amount of flow through a water heating system or any combinations thereof. In one embodiment, the current period of time is about ten days. In one embodiment, the determining step is replaced with determining the service prognosis based on the prior usage and the representative usage. In one embodiment, the method further includes providing an informational message. In one embodiment, the method further includes comparing the prior usage to a threshold usage, wherein if the prior usage is greater than the threshold usage, an alert is raised, otherwise an informational message is raised. In one embodiment, the alert is a message prompting an action to be taken at a later time or a message prompting an action to be taken immediately. In one embodiment, the prior period of time corresponds to a duration selected from the group consisting of a duration based on the difference between the present time and the manufacturing date of the appliance and a duration based on the difference between the present time and the installation date of the appliance. In one embodiment, the appliance is a water heating system, a space heating system, a space cooling system or any combinations thereof. In one embodiment, the service prognosis includes a service prognosis related to scale build-up of the appliance. In one embodiment, the service prognosis includes a service prognosis related to wearing out of one or more components of the appliance. In one embodiment, the method further includes identifying the type of the appliance by using artificial intelligence. In one embodiment, the method further includes identifying the make and model of the appliance by using artificial intelligence. In one embodiment, the method further includes identifying the type of the appliance by using artificial intelligence and retrieving one or more factors affecting the representative usage based on the type of the appliance. In one embodiment, the method further includes identifying the make and model of the appliance by using artificial intelligence and retrieving one or more factors affecting the representative usage based on the make and model of the appliance.

An object of the present invention is to provide a service prognosis for an appliance and one or more of its components.

Another object of the present invention is to provide a service prognosis which not only flags services which are due or exceeded but also provides future service actions which are required.

Another object of the present invention is to provide an automated method for detecting the make and model or the type of appliance to be monitored for a representative usage.

Another object of the present invention is to reduce or eliminate unnecessary service actions and replacement of components or appliance that is still functional given appropriate service actions.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 6 is a table depicting prognosis ratings suitable for use to inform operators of an appliance of service actions.

PARTS LIST

- 2—control device
- 4—firing rate
- 6—flow rate
- 8—turn on-turn off cycle
- 10—operating pressure
- 12—operating temperature
- 14—block
- 16—block
- 18—block
- 20—block
- 22—block
- 24—flue temperature
- 26—burner on time
- 28—block

PARTICULAR ADVANTAGES OF THE INVENTION

In one aspect, conventional service actions of an appliance, an equipment or a component are typically carried out based on elapsed time from the time the last service actions were performed without regarding to the amount of apparent usage, e.g., on time and firing rate, etc., or even true usage that reflects the true condition of the equipment or component for which a service action is assessed. Often times, equipment and components are replaced simply because true condition data is unavailable for the equipment and components and a known condition is required of the equipment and components so that future service actions can be planned, resulting in significant amounts of waste due to unjustified replacements, etc. In one embodiment of the present method, a true present condition is obtained over a period of time and this true present condition is extrapolated for the period/s for which no true usage data was collected. In one embodiment, the present method of formulating a service prognosis for an appliance by determining a cumulative usage during a period of the appliance based on at least one operating parameter and an estimated duration of usage of the appliance during the period.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 1:
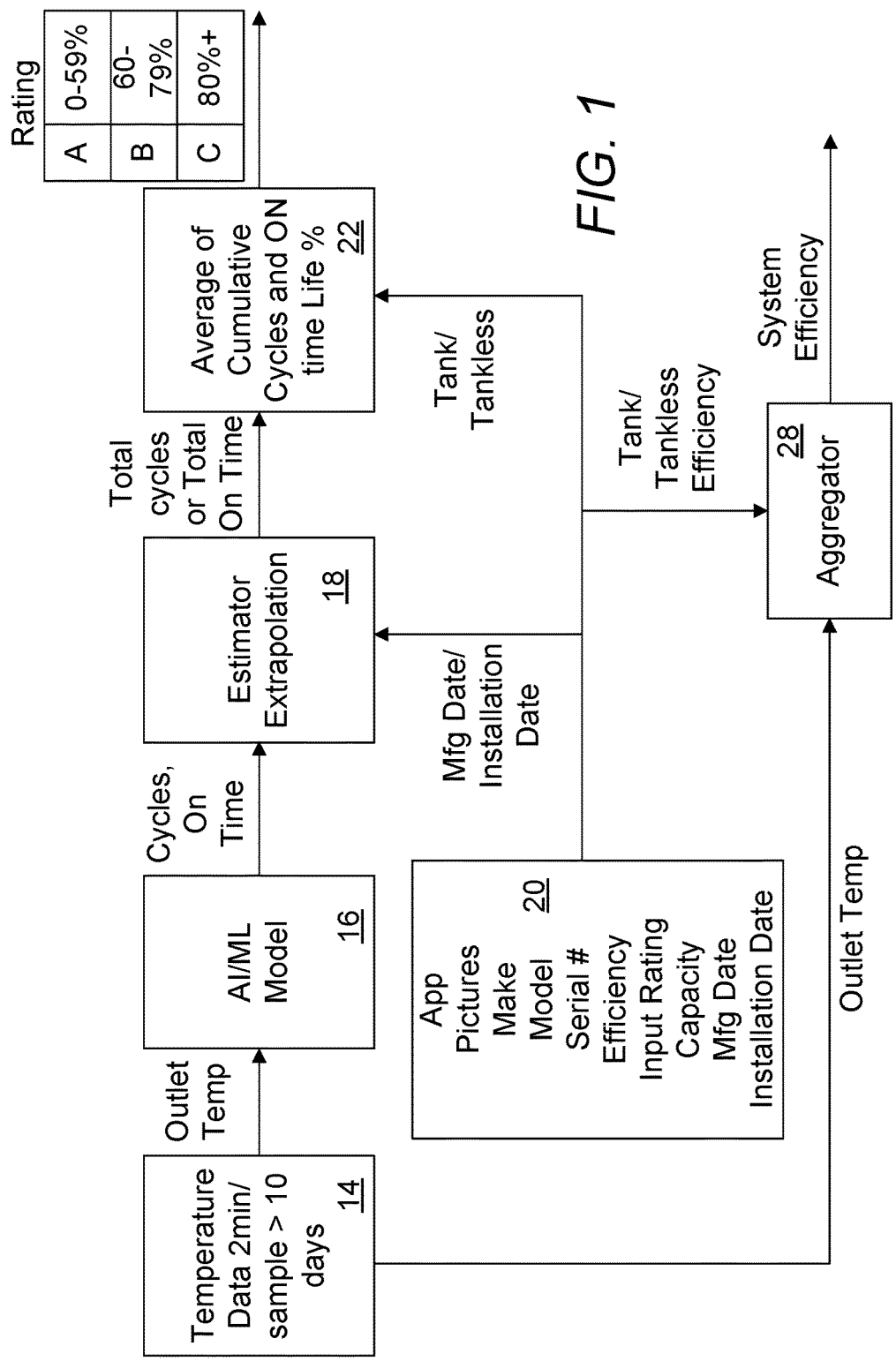
FIG. 1 is a diagram depicting a method by which a service prognosis is formulated.

FIG. 1 is a diagram depicting a method by which a service prognosis is formulated. An example is provided for a water heating system although the same method is applicable to another appliance. Block 14 represents an activity including collecting operating data, e.g., temperature, pressure, flow rate, water hardness, etc., of an appliance, over a period of time. This activity can be an activity that accompanies the installation of an appliance or can be an activity that is carried out during the service life of the appliance and it can include making available data collecting and/or control devices and services, sensors and switches, etc. In a conventional installation process of an appliance, no provisions are made to ensure that necessary data is collected to assist in assessing future service actions that would need to be performed. As the necessary operating data collecting and/or control devices, sensors and switches, etc., are unavailable as part of the appliance itself or installed alongside and functionally integrated with the appliance, no service actions can be determined. Therefore, without any knowledge of the operating history of an appliance, the only option left for service actions to be performed is through a scheduled maintenance appointment. A scheduled maintenance is performed, e.g., annually, e.g., in applications where the appliance is moderately used and more frequently if the appliance is thought to be more heavily used. If the necessary operating data collecting and/or control devices, sensors and switches, etc., are available as part of the appliance itself or installed alongside and functionally integrated with the appliance, operating data collection can occur from the beginning of the service life. However, if the desired data is unavailable, as it is not collected from the beginning of the service life, a scheduled maintenance process is often then the only option. Applicant discovered that the lack of the necessary information to assess the necessary current and future service actions does not need to confine the current and future service actions to scheduled maintenance processes. Even when no operating data has been collected since installation, the current condition and current usage of an appliance can be assessed by carrying out activities in block 14. The current usage can be treated as a representative usage upon which an inference or extrapolation can be based to assess the prior usage incurred on the appliance or its components for a period for which no operating data is available, i.e., any period or periods for which no operating data was collected. A method for formulating a service prognosis for an appliance can then be summarized as follows: A representative usage during a current period of time is first determined. A prior usage based on the representative usage, for a prior period of time is then extrapolated to result in a prior usage; and the service prognosis based on substantially the prior usage is then determined. As an example, if the amount of flow through a water heating system is 78 gals. during a current monitoring period of, e.g., 10 days, the prior usage over a prior period of 1000 days can be derived based on this representative usage to result in a prior usage of 78 gals. X (1000 days/10 days) or 7,800 gals. Applicant discovered that a period of about 10 days provides a sufficient period of time for usage patterns to be observed and sufficient usage to have occurred for data collection. In one example, if a monitored device is a tank water heating system, the amount of scale deposit or build-up can generally be determined by using a looked-up water hardness value based on the zip code of the locale in which the appliance is used and the volume of hot water used, a value that can be determined using the flow rates of water over time. Hot water is disposed at a narrow temperature range in a tank water heating system and therefore is not a significant variant in affecting the scale deposit rate. The amount of scale deposit can be obtained from charts relating the "weight of lime deposited per year" with respect to the "amount of hot water user per day" for water temperature of a range, e.g., 120, 130, 140, 150, 160, 170, 180 degrees F., respectively. The thickness of a scale layer can be determined by using an efficiency of the water heater. A thicker scale layer in a heat exchanger corresponds to a lower heat transfer rate from a burner to the water flow through the heat exchanger, therefore a less efficient heat exchanger. The efficiency of the water heater can in turn be determined using the flue temperature. A high flue temperature can mean an inefficient heat transfer from burner to water via a heat exchanger. This can indicate an inefficient heat exchanger due to scale build-up. Applicant discovered that, for a tankless water heating system, the water heating system pressure and temperature may significantly affect whether scale deposits will form as will be disclosed elsewhere herein. Although the method for formulating a service prognosis is shown with examples of water heating systems, this method is applicable to other appliances, e.g., space heating systems which already share some common components in some cases and space cooling systems, etc., as long as a current representative usage is a close representation of its past usage.

In FIG. 1, block 14 is shown to monitor the flue temperature and additionally may include a flue temperature time derivative, e.g., flue temperature rise rate, and provides it to block 16 which uses it to produce an identification of the type of the appliance by using artificial intelligence which may or may not also employ machine learning. Block 16 represents any control algorithms, strategies, methods and steps, etc., useful for inferring the type of appliance, e.g., tank or tankless water heating system and make and model of a water heating system, etc., to automatically and expeditiously provide linkages to any look-up data specific to the type and make and model of the equipment without intervention from a service personnel. For instance, if a flue temperature supplied from block 14 is determined in block 16 to fall in a flue temperature range specific only to a tank water heating system, databases, methodologies and look-up tables, etc., that are related to tank water heating systems will be used. In one example, as the type of water heating system has been determined in block 16 to be a tankless water heating system, burner firing cycles and burner turn-on time can then start to be tallied. In one example, as the make and model of water heating system has been determined in block 16 to be a tankless water heating system, burner firing cycles and burner turn-on time can be identified more precisely so that they can start to be tallied more precisely as the burner firing cycles can differ depending on the make and model of the appliance containing the burner. If it is impossible to determine the type, make and model of water heating system in block 16, the pertinent information can be provided instead by block 20. Block 20 represents equipment information that can be supplied automatically or manually, e.g., with the aid of a service personnel, to block 18 or block 22 and contains such information as pictures of the appliance, make, model, serial number, efficiency, input rating, capacity, manufacturing date and installation date, etc. Every burner firing cycle requires that the igniter of the burner to be lit. Repeated uses of the igniter cause the igniter to wear out and fail to ignite eventually. Each firing cycle requires an igniter to be functional at least once. The indication of a burner turn on can differ depending on the make and model of the water heating system. Block 20 represents information specific to the equipment, e.g., manufacturing date and/or installation date of the equipment. If the installation date of the equipment is unavailable, the manufacturing date will be used instead in block 18. Block 18 receives data input from blocks 16 from which the representative usage is determined and the manufacturing date/installation date from block 20 to determine the prior usage, i.e., the total number of firing cycles and the total amount of time the burner was turned on in the prior period. Therefore, in one embodiment, the prior period of time corresponds to a duration based on the difference between the present time and the manufacturing date of the appliance. In another embodiment, the duration is based on the difference between the present time and the installation date of the appliance. Block 28 represents a function which receives water heating system efficiency information from block 20 and compares it to the expected flue temperature of the water heating system to provide a system efficiency. If the system efficiency is determined to be lower than expected, as indicated by a higher-than-expected flue temperature, this finding can be communicated to service personnel.

In one embodiment, the prior usage alone is used in the subsequent block, i.e., block 22. In another embodiment, an aggregate of the prior usage and the representative usage is used in block 22. If an appliance has been turned on for a significant amount of time compared to the amount of time used for determining the representative usage, the prior usage alone can be just as reliable as the aggregate.

Figure 2:
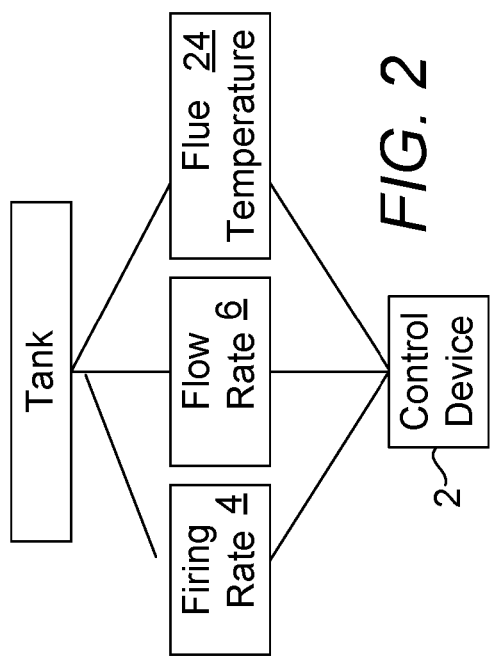
FIG. 2 is a block diagram depicting non-exhaustive examples of monitored components and parameters of a tank water heating system.
Figure 3:
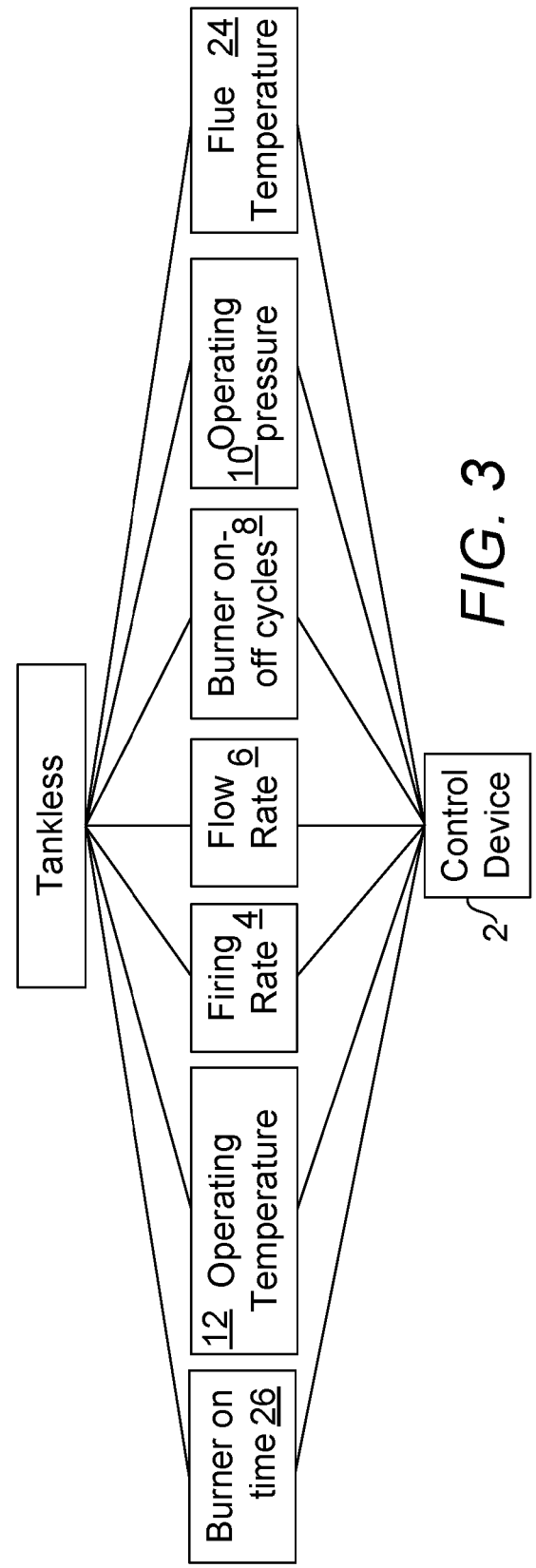
FIG. 3 is a block diagram depicting non-exhaustive examples of monitored components and parameters of a tankless water heating system.

FIG. 2 is a block diagram depicting non-exhaustive examples of monitored components and parameters of a tank water heating system. For a tank water heating system, the firing rate 4, flow rate 6 and flue temperature 24, etc., are some of the critical operating parameters to be monitored with a control device 2 that is integrally provided with the water heating system or separately provided. FIG. 3 is a block diagram depicting non-exhaustive examples of monitored components and parameters of a tankless water heating system. For a tankless water heating system, the burner on time 26, operating temperature 12, firing rate 4, flow rate 6, burner on-off cycles 8, operating pressure 10 and flue temperature, etc., are some of the critical operating parameters to be monitored with a control device that is integrally provided with the water heating system or separately provided. All the parameters are monitored via existing sensors or again separately provided sensors.

Figure 4:
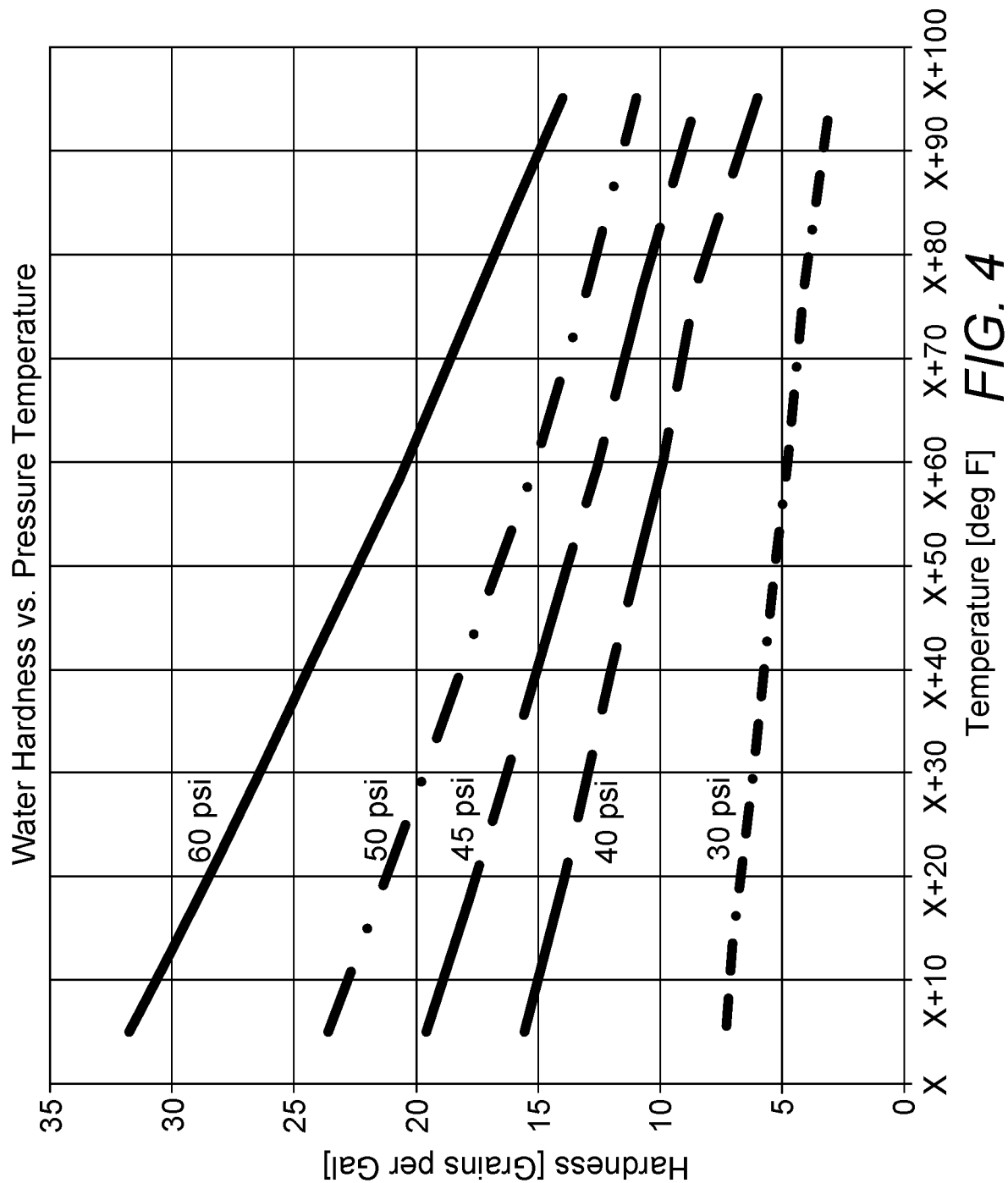
FIG. 4 is a chart of water hardness with respect to operating pressure and operating temperature.
Figure 5:
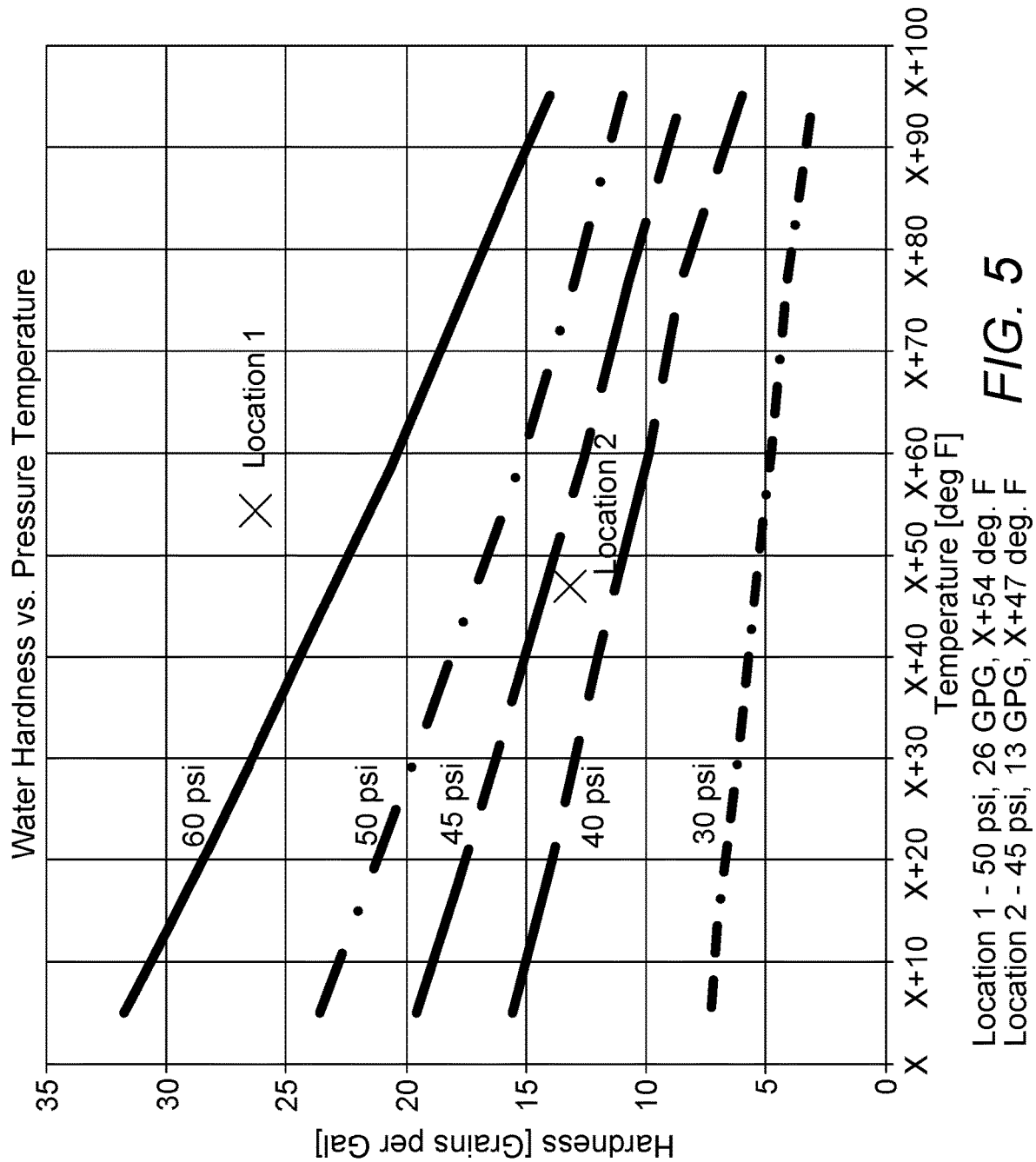
FIG. 5 is a chart of water hardness with respect to operating pressure and operating temperature with a plurality of operating scenarios disposed on the chart.

FIG. 4 is a chart of water hardness with respect to operating pressure and operating temperature of a tankless water heater. In general, at a particular operating pressure, the water hardness drops at higher temperatures. For instance, at 60 psi and (X+5) degrees F., the water hardness is disposed at about 32 grains/gal., where X represents a number. However, the hardness at (X+95) degrees F. is only about 14 grains/gal. FIG. 5 is a chart of water hardness with respect to operating pressure and operating temperature of a tankless water heater with a plurality of operating scenarios, i.e., operating scenarios at location 1 and location 2 disposed on the chart. At Location 1, the operating pressure is 50 psi, the water hardness is 26 grains/gal., the operating temperature is (X+54) degrees F. At Location 2, the operating pressure is 45 psi, the water hardness is 13 grains/gal., the operating temperature is (X+47) degrees F. In general, a location experiencing an operating condition (hardness and temperature) that falls below a chart will not experience scaling and the operating condition that rises above the chart will experience scaling. It shall be noted that at Location 1 which is disposed at operating pressure of 50 psi, the chart that is used for determining whether scaling occurred at this location is the chart labelled 50 psi. As the operating condition places this point above the 50 psi chart, this location is thought to be prone to scaling and therefore further formulation of a service prognosis will be required to produce service actions. As Applicant discovered that the operating pressure and temperature play significant roles in scaling of a tankless water heating system, in formulating a service prognosis, the amount of time the tankless water heating system is producing hot water must be considered. A representative usage is first obtained before a prior usage is extrapolated to produce a service prognosis, the steps to produce which have been disclosed elsewhere herein. At Location 2, as the operating pressure is 45 psi, the chart of interest is now the 45 psi chart. Here, it shall be noted that as the operating condition places this point below the 45 psi chart, no scaling is expected to occur and therefore no service prognosis will need to be formulated with respect to scaling concerns.

FIG. 6 is a table depicting prognosis ratings suitable for use to inform operators of an appliance of service actions. Upon determining the representative usage and prior usage of an equipment or component, the aggregate of the prior usage and representative usage or the prior usage alone is compared to a threshold usage, wherein if the aggregate or the prior usage alone is greater than the threshold usage, an alert is raised, otherwise an informational message is raised. An informational message could be "operating normally, rerun diagnostics in 1 year" when the equipment or component under evaluation has a significant amount of useful life. Another informational message useful for informational purposes could be "operating normally, but replace within six months or risk unplanned failure." The latter informational message signifies that a replacement is forthcoming but the service action does not need to be performed for several more months. An alert conveys the urgency of a service action with one example being "operating poorly and needs to be replace within next two months." Here, the amount of time to which a service action is suggested is now hastened to two months. The most urgent alert message may state "failed or imminent failure, needs to be replaced." This message prompts its recipient for a service action to be taken immediately.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A method for formulating a service prognosis for an appliance functionally connected to a control device, said method comprising:
   (a) determining a type of the appliance based on at least one operating parameter of the appliance, said type of the appliance is a type selected from the group consisting of a tank water heating system and a tankless water heating system, said at least one operating parameter of the appliance is an operating parameter selected from the group consisting of operating pressure, water hardness, flue temperature, flue temperature rise rate and any combinations thereof, wherein said tank water heating system is identified by said flue temperature falling in a first temperature range and said tankless water heating system is identified by said flue temperature falling in a second temperature range;
   (b) collecting a representative usage of the appliance during a current period of time using the control device, wherein said representative usage of the appliance during a current period of time is a measure selected from the group consisting of a total number of firing cycles of a burner of the appliance during a current period of time, a total amount of time a heat exchanger of the appliance has been in use during a current period of time and a combination thereof;
   (c) upon collecting said representative usage of the appliance during a current period of time, extrapolating a prior usage of the appliance during a prior period of time based on said representative usage of the appliance during a current period of time using said control device by multiplying said representative usage of the appliance during a current period of time by a ratio of said prior period of time to said current period of time; and
   (d) determining the service prognosis comprising a service prognosis related to wearing out of an ignitor of said burner of the appliance based on an extrapolated total number of firing cycles of the appliance during a prior period of time and the type of the appliance using said control device.

2. The method of claim 1, wherein said current period of time is eight to twelve days.

3. The method of claim 1, wherein said step (d) is replaced with determining the service prognosis comprising a service prognosis related to wearing out of said burner of the appliance based on an extrapolated total number of firing cycles of the appliance during a prior period of time and a total number of firing cycles during a current period of time and the type of the appliance using said control device.

4. The method of claim 1, further comprising providing an informational message using the control device.

5. The method of claim 1, further comprising comparing said prior usage of the appliance during a prior period of time to a threshold usage using the control device, wherein if said prior usage of the appliance during a prior period of time is greater than said threshold usage, an alert is raised, otherwise an informational message is raised using the control device.

6. The method of claim 5, wherein said alert is selected from a message prompting an action to be taken at a later time and a message prompting an action to be taken immediately.

7. The method of claim 1, wherein said prior period of time corresponds to a duration selected from the group consisting of a duration based on the difference between the present time and the manufacturing date of the appliance and a duration based on the difference between the present time and the installation date of the appliance.

\* \* \* \* \*